United States Patent [19]
Matthews

[11] Patent Number: 6,104,601
[45] Date of Patent: Aug. 15, 2000

[54] PANEL ADAPTER FOR A SOCKET MOUNTED ELECTRICITY METER

[76] Inventor: Christopher Howard Matthews, 2637 Bailey Dr., Norcross, Ga. 30071

[21] Appl. No.: 09/238,392

[22] Filed: Jan. 27, 1999

Related U.S. Application Data

[60] Provisional application No. 60/072,828, Jan. 28, 1998.

[51] Int. Cl.[7] .................................................. H02B 1/00
[52] U.S. Cl. .......................... 361/665; 361/664; 361/666; 361/668; 439/517
[58] Field of Search .................... 361/659–672; 439/517, 366

[56] References Cited

U.S. PATENT DOCUMENTS

| | | | |
|---|---|---|---|
| 1,788,624 | 1/1931 | Horton | 361/665 |
| 2,182,603 | 12/1939 | Walker et al. | 361/667 |
| 2,715,700 | 8/1955 | Rothstein et al. | 361/671 |
| 3,636,498 | 1/1972 | McQuarrie | 361/665 |
| 3,997,840 | 12/1976 | Pearson | 361/665 |
| 4,404,521 | 9/1983 | Fennell | 324/110 |

*Primary Examiner*—Leo P. Picard
*Assistant Examiner*—Boris L. Chervinsky
*Attorney, Agent, or Firm*—Sanford J. Asman

[57] ABSTRACT

A panel adapter for a socket meter allows a socket mounted electricity meter to be installed in a switchboard. The adapter is designed to attach to the back of the front of a switchboard, and it is substantially in the shape of a rectangular cube having a front wall and a rear wall. A meter socket is mounted to its rear wall, and the front wall has an opening which may have a diameter which is substantially the same as the front of the meter, or, alternatively, which is larger so as to enable a meter to be mounted in its socket through the opening. If the opening is larger than the meter, the adapter may, optionally, include a removable face plate to fill the space left by the larger opening. Embodiments of the panel adapter include data connectors on the rear wall, and adjustable length legs to allow for the installation of meters having differing lengths.

21 Claims, 6 Drawing Sheets

PANEL ADAPTER FOR A SOCKET MOUNTED ELECTRICITY METER

CROSS-REFERENCE TO RELATED APPLICATIONS

The present application is based upon provisional patent application Ser. No. 60/072,828 filed Jan. 28, 1998.

BACKGROUND OF THE INVENTION

The present invention relates to electricity meters. In particular, the present invention relates to an adapter which can be used to convert a standard'socket mounted electricity meter for use as a small case switchboard meter or as a large case switchboard meter.

As is known by those skilled in the electrical metering arts, socket mounted meters are used in numerous locations. As used herein, the term "socket mounted meter" is intended to mean an electricity meter which is intended to be mounted in a base. Common examples of socket mounted meters are those electricity revenue meters which are found on the sides of homes and commercial buildings and in substations.

As used herein, the term "switchboard" is used to refer to a relatively large, flat panel which has metering equipment mounted thereon, or more typically, therethrough, such that the metering equipment may be viewed from the front. However, the electrical connections to the panel mounted meters are made at the rear of the switchboard panel.

Due to the nature of a switchboard, in which the intent is to maintain a relatively flat frontal appearance, a class of metering equipment, called small case meters have been designed to mount either on, or through, switchboards in order to be able to have only their display portions, or a relatively small portion of the meter, exposed on the front side of the meter.

Another factor which is present in typical small case meters, of the type intended for use on a switchboard, is that they are generally adapted to be mounted from the front, and they are thereafter wired from the rear, enabling a single person to be able to both mount and wire them.

Heretofore the different physical configuration of a socket meter, in which the meter is significantly longer than what would be desired to extend through the panel prevented standard meters from being used, also, as switchboard meters. The present invention provides an apparatus which allows a standard socket meter to be used as a switchboard meter, so it is not necessary to store both socket meters and switchboard meters. A socket meter used with the present invention, as a switchboard meter, can readily be removed and used as a standard socket meter.

DETAILED DESCRIPTION OF THE EXEMPLARY EMBODIMENTS

Figure 1:
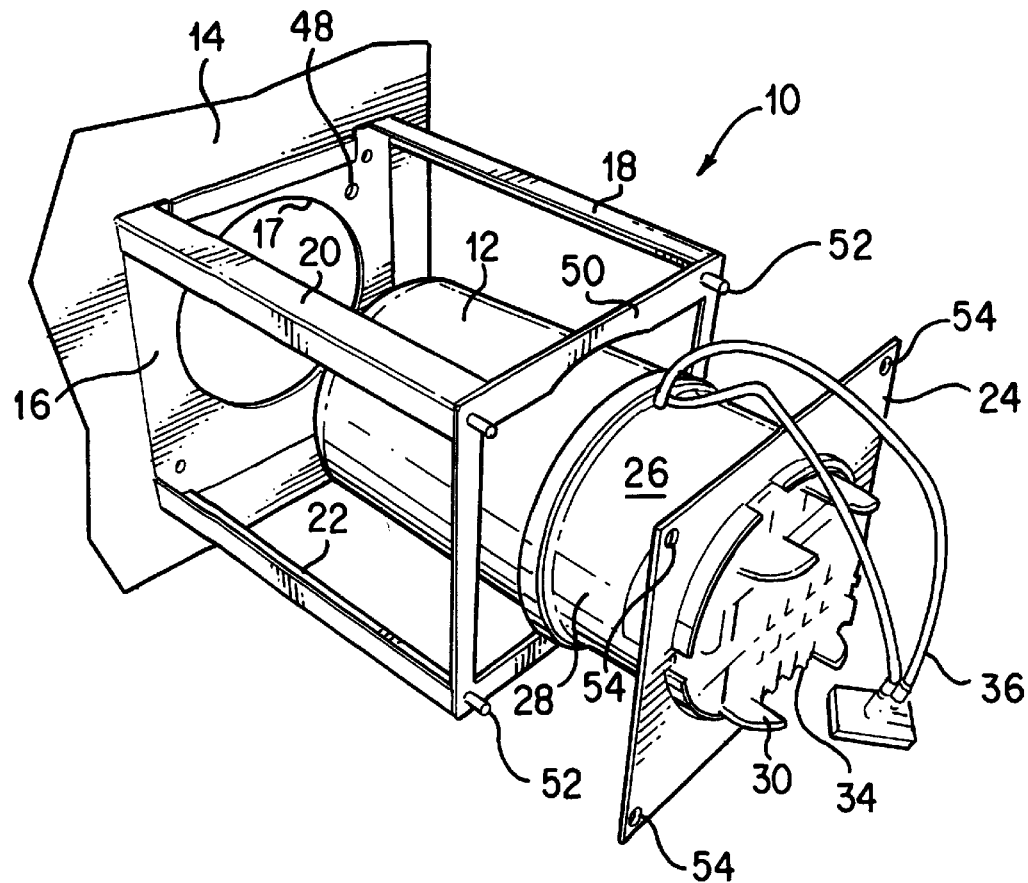
FIG. 1 illustrates a perspective view, showing the present invention, and illustrating how a socket meter is mounted in it.
Figure 3:
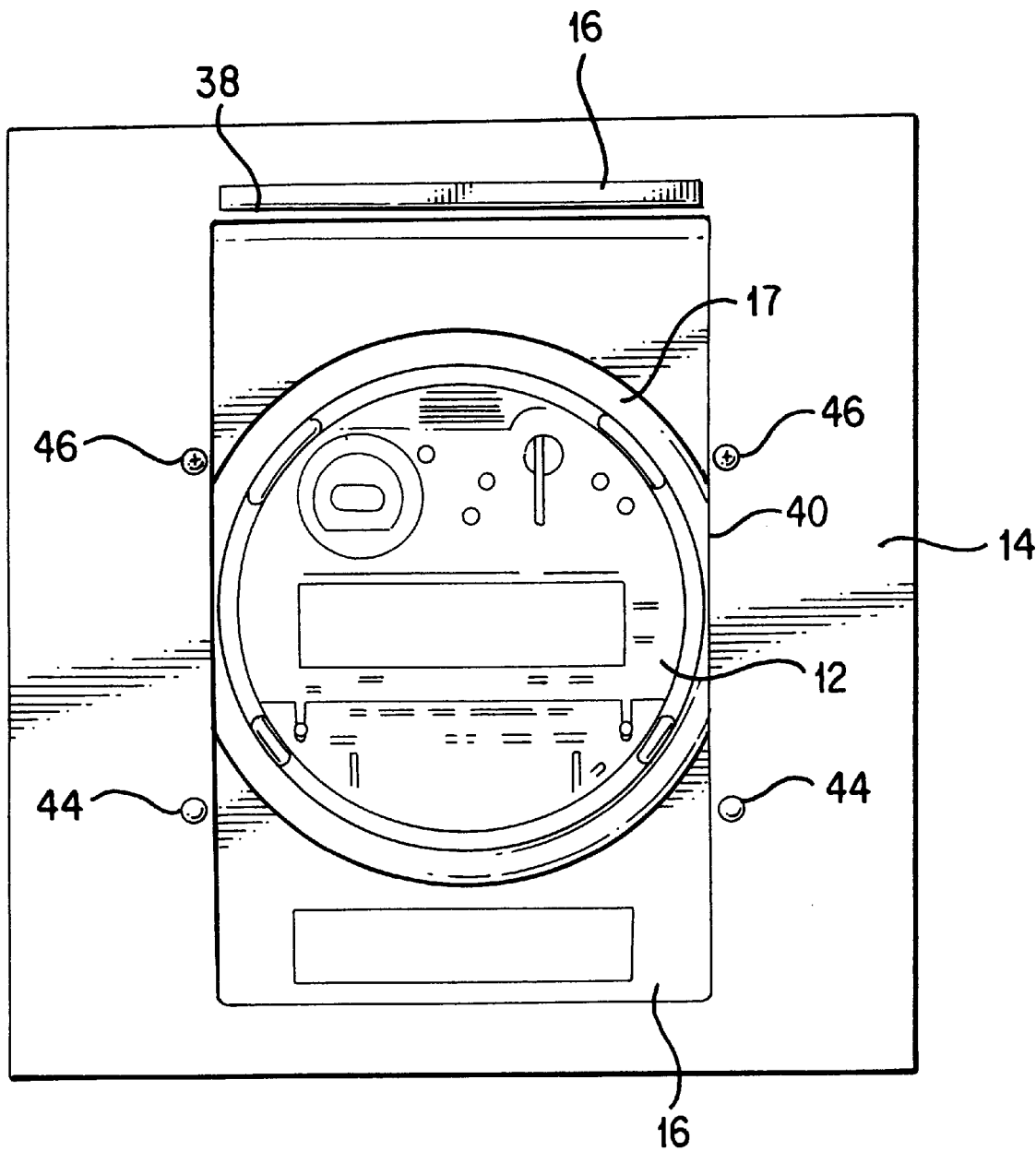
FIG. 3 illustrates a front view of a switchboard showing how a socket meter appears when viewed from the front of the switchboard when the present invention is used to mount it.

Referring first to FIG. 1, a first embodiment 10 of the panel adapter of the present invention is shown. As shown, the panel adapter 10 allows a standard socket mounted meter 12 to be mounted in a switchboard 14. The panel adapter 10 is comprised of a front wall 16 having an opening 17, formed therein. The face 19 of the meter 12 will be visible through the opening 17, when the meter 12 is installed in the adapter 10, as shown in FIG. 3. As shown in FIG. 3, the face 19 of the meter 12 will be substantially flush with the front of the switchboard 14, following installation. As used herein, the term "substantially flush" is intended to mean that the face 19 of the meter 12 can protrude somewhat through the switchboard 14, or that it can be coplanar with the front of the switchboard 14, or that it can be somewhat behind the front of the switchboard 14.

Figure 2:
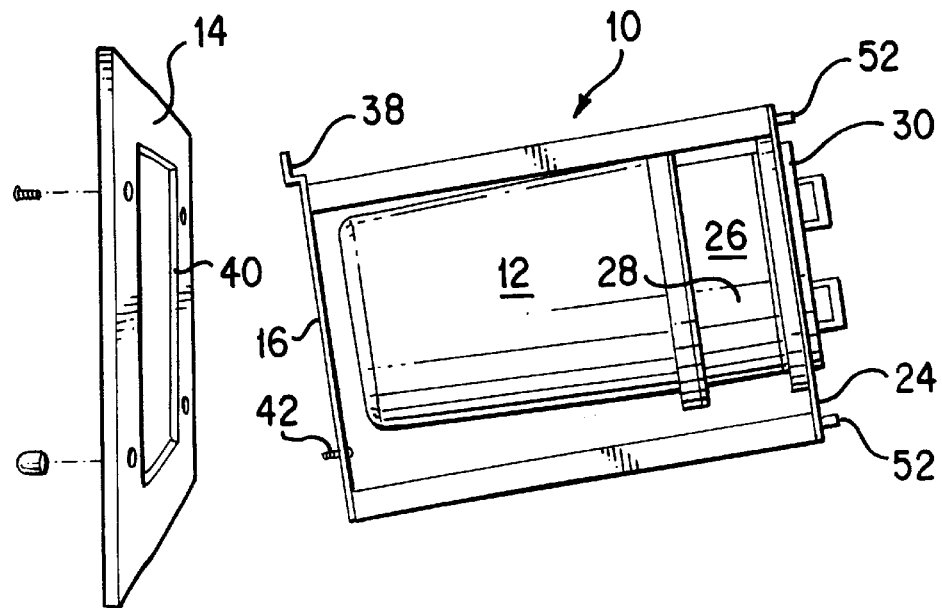
FIG. 2 illustrates the manner of mounting the present invention, together with a socket mounted therein, in a switchboard.

With continued reference to FIGS. 1 and 2, the front wall 16 has four legs attached to it, of which three of the legs 18, 20, 22, are visible in FIG. 1. The adapter 10 further includes a rear wall 24, on which a meter socket 26 is mounted. As shown in FIG. 1, the meter socket 26 has a socket portion 28, to which the meter 12 is attached, and a connection portion 30, which extends to the rear of the rear wall 24. At the rear of the connection portion 30, there are terminal blocks 34 used to make electrical connections to the meter 12. The meter socket 26, in the preferred embodiment of the invention, is wired with an input/output cable 36 which may be used to provide pulse outputs from the meter 12 to a data recorder or other device. Alternatively, the input/output cable 36 may be used for serial communications between the meter 12 and an external device (not shown).

With continued reference to FIGS. 1–3, the front wall 16 optionally includes an elongated hook 38, which is narrower than the width of the front wall 16, and which is offset from the remainder of the front wall 16, so that the hook 38 can extend through the cut-out opening 40 in the switchboard 14 (See FIG. 3).

The panel adapter 10 of the first embodiment of the invention is easily used by a single installer, even though installation must be accomplished from both sides of the switchboard 14. From the rear of the switchboard 14, the hook 38 on the front wall 16 of the adapter 10 is placed through the cut-out 40. This can be accomplished with the meter 12 installed, as shown in FIG. 2, or with the rear wall 24 removed from the adapter 10. As shown in FIG. 2, in the preferred embodiment of the invention, there are a pair of threaded lugs 42, which are placed through openings 44 in the switchboard 14. The installer then goes to the front of the switchboard (See FIG. 3) where he installs threaded nuts 44 on the lugs 42. Also, screws 46 are inserted though additional openings and screwed into threaded openings 48 (which may be trapped nuts, as shown in FIG. 1) on the front wall 16.

Next, the installer returns to the rear of the switchboard 14, where he installs the rear wall 24 (with the meter 12 already in the socket 26) to the rear frame 50, using threaded lugs 52, which extend through openings 54 on the rear wall 24, as shown in FIG. 1. Wing nuts or other nuts (not shown) are used to install the rear wall 24 to the rear frame of the adapter 10.

The adapter 10 of the present invention can have legs which are of different lengths to adapt meters 12 of different lengths. Hole patterns, openings, and the length of the hook 38 are based upon the openings and hole patterns in standard switchboards, but they may be varied, as needed. The adapter 10 is preferably made of powder coated steel, having a typical thickness of about ⅛ inch, although other materials can be used without departing from the present invention.

Figure 4:
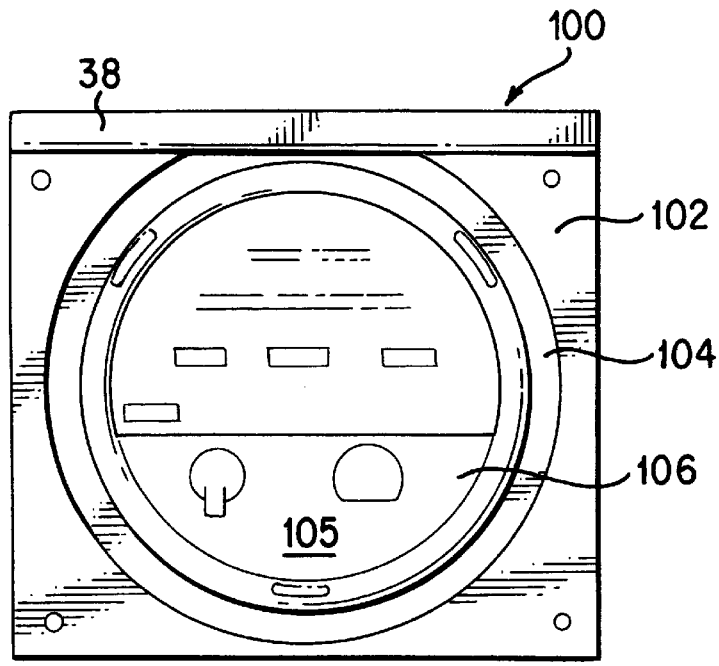
FIG. 4 illustrates a front view of a second embodiment of the present invention which allows a socket meter to be mounted from the front of the panel.

Referring now to FIG. 4, a front view of an alternative embodiment 100 of the invention is shown. In this embodiment 100, the front wall 102 of the adapter 100 has an opening 104 formed therethrough which preferably has a diameter of approximately 1.5 inches larger than the diameter of the face 105 of the meter 106 which is installed using the adapter 100. This larger opening 104 (relative to the opening 17 in the embodiment 10 shown in FIGS. 1–3) enables the user to remove the socket meter 106 from the front (i.e., through the opening 104), as well as from the rear of the switchboard 14, as is done when using the adapter 10 of the first embodiment (See FIG. 1) illustrated in FIGS. 1–3. In the adapter 10 of the first embodiment the socket meter 12 can be installed and removed only from the rear of the switchboard 14, by removing the rear wall 24 (See FIG. 1).

In view of the fact that the embodiment 100 permits the socket meter 106 to be mounted from the front of the switchboard, rather than from the rear of the switchboard, it is not necessary, when using the embodiment 100 to mount the meter 106 and its associated socket 108 to the rear wall 110 of the adapter 100 prior to mounting the adapter 100 to the rear of the switchboard, as it was necessary to mount the meter 12 along with its associated socket 26 to the rear wall 24 of the adapter 10 of the first embodiment (See FIGS. 1 and 2) before mounting the adapter 10 of the first embodiment to the rear of the switchboard. Instead, the socket 108 is mounted to the rear wall 110 of this embodiment of the adapter 100 with the meter 106 either installed or not installed. If the meter 106 has not been installed when the adapter 100 is mounted to the switchboard, then the meter 106 may be installed through the opening 104 in the front 102 of the adapter 100. Of course, even if the meter 106 is installed from the rear of the switchboard, this embodiment of the adapter 100 permits the meter 106 to be removed and/or replaced from the front of the switchboard, whereas the adapter 10 of the first embodiment requires removal of the rear wall 24 each time a meter 12 is installed or removed.

Figure 6:
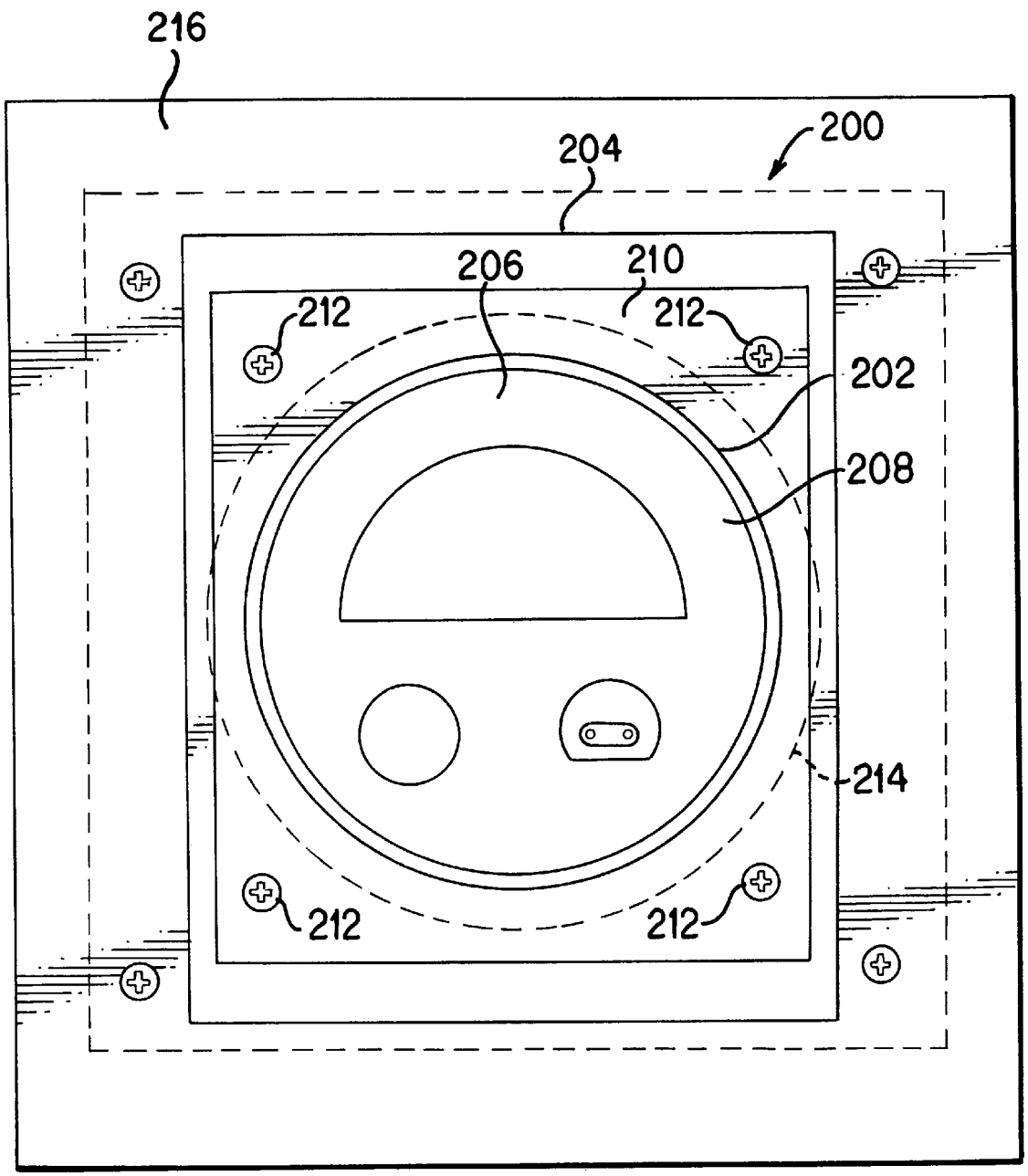
FIG. 6 illustrates a front view of a third embodiment of the present invention which allows a socket meter to be mounted from the front of the panel, but which does not expose a large opening when the meter has been installed.

Referring to FIG. 6, an adapter 200 of yet another alternative embodiment of the of the present invention is shown. In the adapter 200, the opening 202 in the front wall 204 of the adapter 200 is substantially the same diameter as the face 206 meter 208. However, in the adapter 200, the front wall 204 includes a removable face plate 210, which is shown as being attached to the front wall 204 by a screws 212. Beneath the removable face plate 210 there is another, larger opening 214 (shown in shadow). While the opening 214 is shown as being round, it can be rectangular or other suitable shape without departing from the concept disclosed with respect to this embodiment 200 of the invention, which is that the removable face plate 210, can be removed from the front wall 204 of the adapter 200, by removing the screws 212. With the face plate 210 removed, the larger opening 214 is exposed, and the meter 208 can be installed, removed, or repalced from the front of the switchboard 216 as could be done with the embodiment 100 of the adapter, as shown in FIG. 4.

Another modification shown in the embodiment 200, but which could be used in any of the embodiments of the adapter is the absence of the hook 38 shown in FIGS. 2 and 3.

Figure 5:
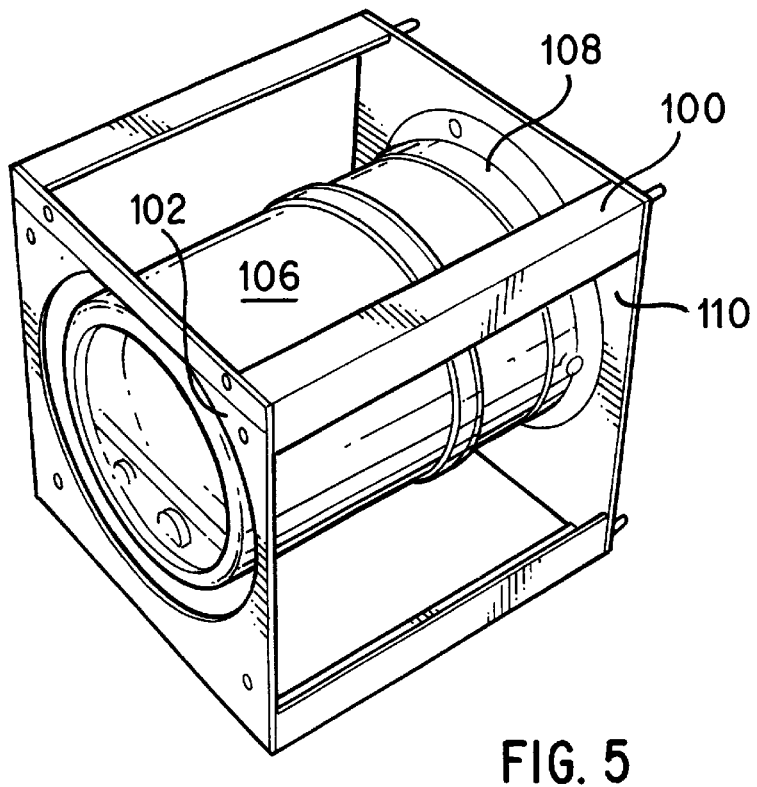
FIG. 5 illustrates a perspective view of the embodiment of FIG. 4 showing how a socket meter appears when mounted in that embodiment of the invention.
Figure 7:
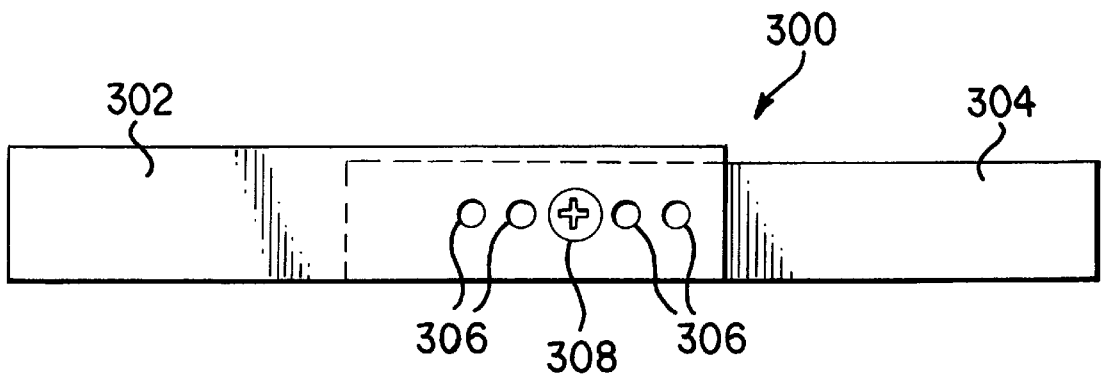
FIG. 7 illustrates a side view of a first embodiment of an adjustable leg design for the adapter of the present invention.
Figure 8:
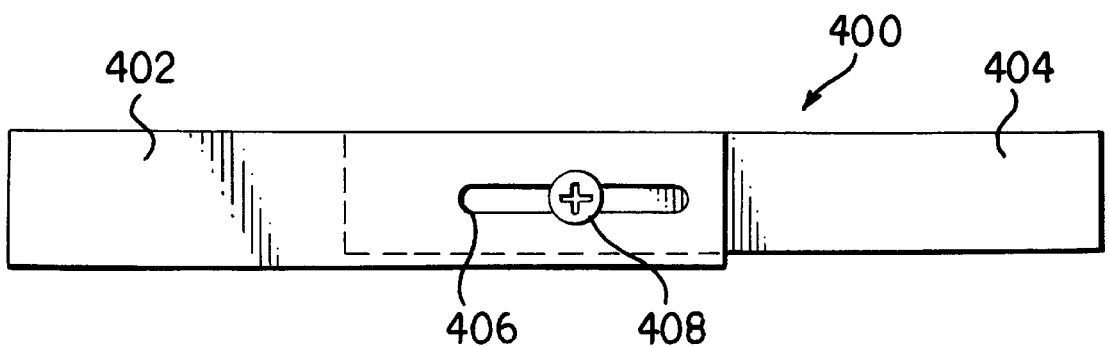
FIG. 8 illustrates a side view of a second embodiment of an adjustable leg design for the adapter of the present invention.

Referring now to FIGS. 7 and 8, still other variations on the present invention are shown. In particular, while the embodiment 10 shown in FIGS. 1, 2, and 5, was shown as having legs which had a fixed length, there are meters which have different lengths. Accordingly, in order to provide an adapter which can be used with various meters, it is necessary to manufacture different adapters which have legs having different fixed lengths. In order to minimize costs while retaining manufacturing flexibility, it may be desirable to provide adapters having legs whose lengths can be varied. This can be accomplished by providing adapters with an adjustable leg configuration, as shown in FIGS. 7 and 8.

In FIG. 7, the adjustable leg 300 is comprised of a first leg portion 302 and a second leg portion 304. The first leg portion 302 includes a series of fixed openings 306 which are spaced from one another, while the second leg 304 portion includes at least one tapped opening which can be used to receive a screw 308. Alternatively, there can be one or more openings in the first leg portion 302, and the second leg portion can include a number of tapped openings. In either case, by selecting a suitable opening 306 in the first leg portion, and matching it with a suitable tapped opening in the second leg portion 304, the overall length of the leg 300 can be readily adjusted.

Similarly, with reference to FIG. 8, an adjustable leg 400 is comprised of a first leg portion 402 and a second leg portion 404. The first leg portion 402 includes an elongated opening 406, while the second leg portion 404 includes a tapped opening which can be used to receive a screw 408. The overall length of the leg 400 can be adjusted by sliding the leg portions 402, 404, and then tightening the screw 408 when a suitable length has been achieved.

Figure 9:
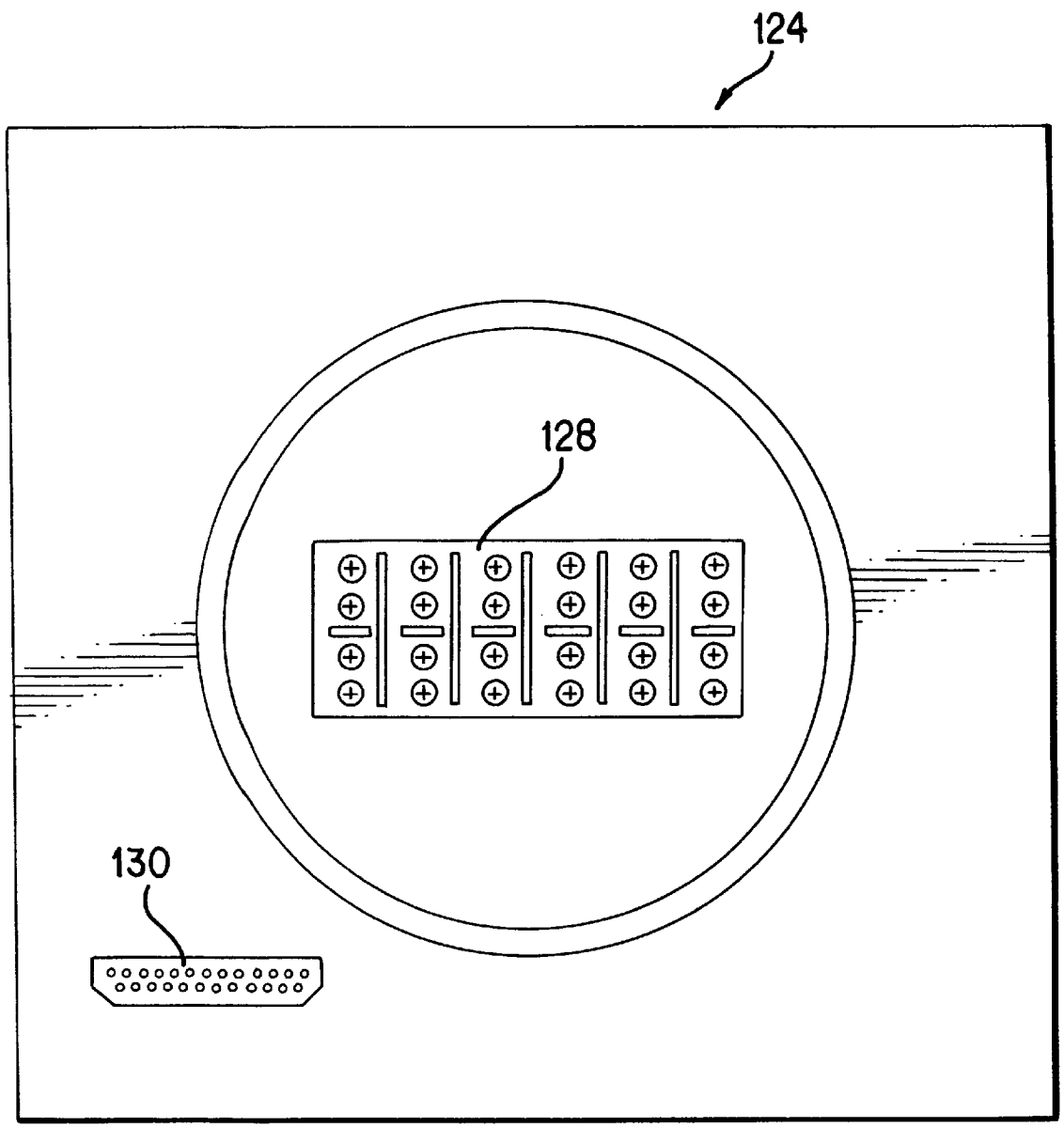
FIG. 9 is a rear view of the rear wall of an alternative embodiment of the adapter of the present invention.

As described above with reference to FIG. 1, the rear wall 24 of the adapter 10 has a meter socket 26 mounted to it. The meter socket 26 includes a connection portion 30 to which electrical connections to the meter 12 are made when the meter 12 is in the adapter 10. An input/output cable 36 connected to the meter 12 is shown as being separate from the rear wall 24. As it may be desirable to avoid having a loose cable, FIG. 9 illustrates an alternative rear wall 124 which includes the standard connectors 128, but which also includes a panel mounted input/output connector 130 which is mounted to the rear wall 124 in order to avoid the loose cable. Instead, the front portion of the rear wall 124 includes a connector (not shown) to which the input/output cable 36 is connected, and the panel mounted input/output connector 130 provides data accessibility, without the need for a loose cable as in FIG. 1.

While a number of designs for the present invention have been disclosed, those skilled in the art will recognize that other design differences may be utilized without departing from the scope of the present invention.

I claim:

1. A panel adapter for use with a socket mounted electricity meter, comprising:

(a) a front wall having an opening formed therethrough, said opening having a size which is substantially the same as the size of the front surface of a socket meter which is intended to be mounted in said panel adapter;

(b) a rear wall which is adapted to have mounted thereon a socket suitable for mounting a socket mounted electricity meter;

(c) a plurality of legs which extend between said front wall and said rear wall, said legs spacing said rear wall from said front wall, said legs having a length which is selected to allow an front surface of the electricity meter which is to be mounted in said adapter to be substantially flush with said opening formed in said front wall of said adapter; and (d) means for mounting said adapter to a panel, whereby a socket mounted electricity meter which is attached to said rear wall will have its front face substantially flush with said opening in said front wall and will be visible through said opening.

2. The panel adapter of claim 1 wherein said legs have a length which spaces said front wall from said rear wall by a distance which is substantially equal to the combined length of said electricity meter and a socket which is mounted on said rear wall.

3. The panel adapter of claim 2 wherein said opening in said front wall is substantially the same size and shape as the front of the electricity meter which is to be mounted on said adapter.

4. The panel adapter of claim 3 wherein said opening in said front wall is round, and the front face of the electricity meter which is intended to be mounted in said panel adapter is also round, and said opening and said front face of said electricity meter are of substantially the same diameter.

5. The panel adapter of claim 2 wherein said opening in said front wall is formed to be sufficiently larger than the front of the electricity meter which is to be mounted on said adapter that said electricity meter can be mounted in a socket attached to said rear wall through said opening in said front wall.

6. The panel adapter of claim 5 further comprising a removable front face plate which has an opening therethrough which is substantially the same size as the front face of a meter to be mounted in said adapter, whereby said face plate can be removed from said opening in said front wall to allow a meter to be inserted into said adapter through said opening in said front wall, or whereby said removable face plate can be installed over said opening in said front wall to eliminate excess space between said opening in said front wall and said face of said meter.

7. The panel adapter of claim 5 wherein said opening in said front wall is round, has a diameter which is at least 1 inch greater than the diameter of the front face of an electricity meter which has a round face, which electricity meter is intended to be mounted in said panel adapter.

8. The panel adapter of claim 2 wherein said front wall further includes a hook which is somewhat narrower than the opening in the switchboard panel to which said adapter is to be attached, said hook having a shape which allows it to be placed through said opening in said switchboard panel, whereby an installer who is installing said panel adapter in a switchboard can use said hook to help hold said panel adapter in place during installation of said panel adapter.

9. The panel adapter of claim 2 further including a connector mounted to said rear wall to allow the pass through of data signals from an input/output cable attached to the meter which is to be installed in said adapter.

10. The panel adapter of claim 1 wherein the length of said legs is adjustable, whereby the space between said front wall and said rear wall can be adjusted to a distance which is substantially equal to the combined length of said electricity meter and a socket which is mounted on said rear wall.

11. The panel adapter of claim 10 wherein said opening in said front wall is substantially the same size and shape as the front of the electricity meter which is to be mounted on said adapter.

12. The panel adapter of claim 11 wherein said opening in said front wall is round, and the front face of the electricity meter which is intended to be mounted in said panel adapter is also round, and said opening and said front face of said electricity meter are of substantially the same diameter.

13. The panel adapter of claim 10 wherein said opening in said front wall is formed to be sufficiently larger than the front of the electricity meter which is to be mounted on said adapter that said electricity meter can be mounted in a socket attached to said rear wall through said opening in said front wall.

14. The panel adapter of claim 13 further comprising a removable front face plate which has an opening therethrough which is substantially the same size as the front face of a meter to be mounted in said adapter, whereby said face plate can be removed from said opening in said front wall to allow a meter to be inserted into said adapter through said opening in said front wall, or whereby said removable face plate can be installed over said opening in said front wall to eliminate excess space between said opening in said front wall and said face of said meter.

15. The panel adapter of claim 13 wherein said opening in said front wall is round, has a diameter which is at least 1 inch greater than the diameter of the front face of an electricity meter which has a round face, which electricity meter is intended to be mounted in said panel adapter.

16. The panel adapter of claim 10 wherein said front wall further includes a hook which is somewhat narrower than the opening in the switchboard panel to which said adapter is to be attached, said hook having a shape which allows it to be placed through said opening in said switchboard panel, whereby an installer who is installing said panel adapter in a switchboard can use said hook to help hold said panel adapter in place during installation of said panel adapter.

17. The panel adapter of claim 10 further including a connector mounted to said rear wall to allow the pass through of data signals from an input/output cable attached to the meter which is to be installed in said adapter.

18. The panel adapter of claim 1 wherein said front wall is rectangular in shape and said opening therethrough is round in shape.

19. The panel adapter of claim 18 wherein said rear wall is rectangular in shape.

20. The panel adapter of claim 1 wherein said front wall further includes a hook which is somewhat narrower than the opening in the switchboard panel to which said adapter is to be attached, said hook having a shape which allows it to be placed through said opening in said switchboard panel, whereby an installer who is installing said panel adapter in a switchboard can use said hook to help hold said panel adapter in place during installation of said panel adapter.

21. The panel adapter of claim 1 further including a connector mounted to said rear wall to allow the pass through of data signals from an input/output cable attached to the meter which is to be installed in said adapter.

\* \* \* \* \*